United States Patent [19]

Gervasio et al.

[11] Patent Number: 4,513,206
[45] Date of Patent: Apr. 23, 1985

[54] EXPLOITATION OF WIND ENERGY FOR PRODUCING ELECTRICAL POWER

[75] Inventors: Vincenzo Gervasio, San Donato Milanese; Dino Dinelli, Albano Laziale, both of Italy

[73] Assignee: Snamprogetti S.p.A., Milan, Italy

[21] Appl. No.: 298,283

[22] Filed: Sep. 1, 1981

[30] Foreign Application Priority Data

Sep. 15, 1980 [IT] Italy .................. 24660 A/80

[51] Int. Cl.³ .................. H02P 9/04; F03D 9/00
[52] U.S. Cl. .................. 290/4 C; 290/44; 322/35
[58] Field of Search .......... 290/4 C, 44, 55; 322/35; 74/665 GB

[56] References Cited

U.S. PATENT DOCUMENTS

| | | | |
|---|---|---|---|
| 1,703,064 | 2/1929 | Griffiths | 290/4 C |
| 1,787,930 | 1/1931 | Fletcher | 290/4 C |
| 2,329,675 | 9/1943 | Albers | 290/44 |
| 2,998,101 | 8/1961 | Kendig | 74/713 |
| 4,112,311 | 9/1978 | Theyse | 322/35 |
| 4,239,977 | 12/1980 | Strutman | 290/55 |
| 4,331,881 | 5/1982 | Soderholm et al. | 322/35 |

Primary Examiner—Stanley J. Witkowski
Assistant Examiner—Shelley Wade
Attorney, Agent, or Firm—Hedman, Gibson, Costigan & Hoare

[57] ABSTRACT

A prime mover (4), such as an internal combustion engine, and a wind rotor (1) are connected to an AC generator (2) by a differential gear (3) having its planetary-gear carrier meshing with the shaft of the AC generator (2), and having one of its half-shafts connected to the prime mover (4) and the other of its half-shafts connected to the wind rotor (1). Thus the AC generator (2) produces electrical power of a constant frequency.

2 Claims, 9 Drawing Figures

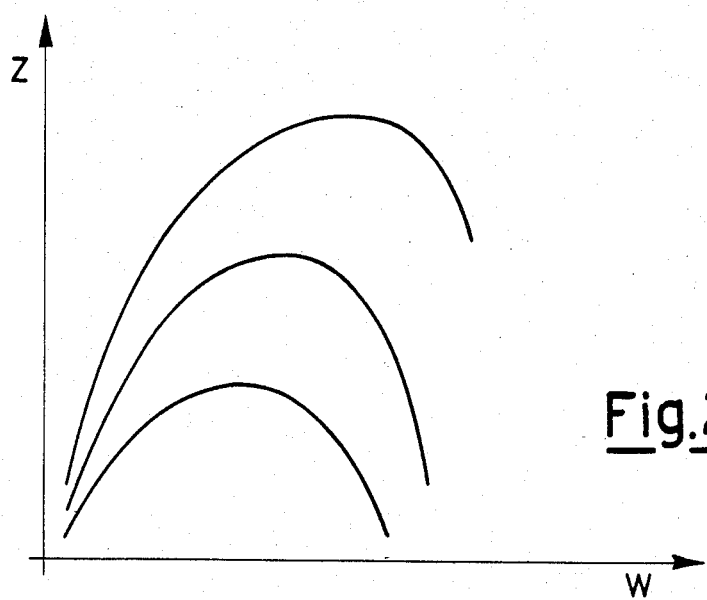
Fig.2A
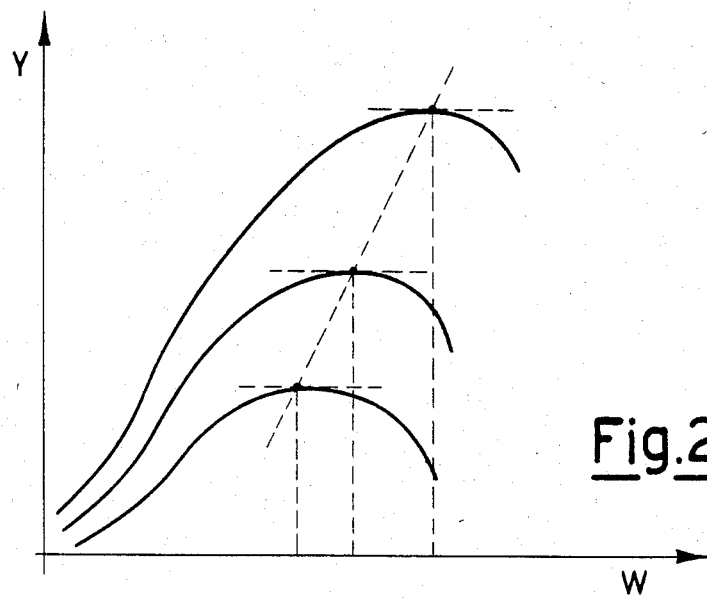
Fig.2B
Fig.2

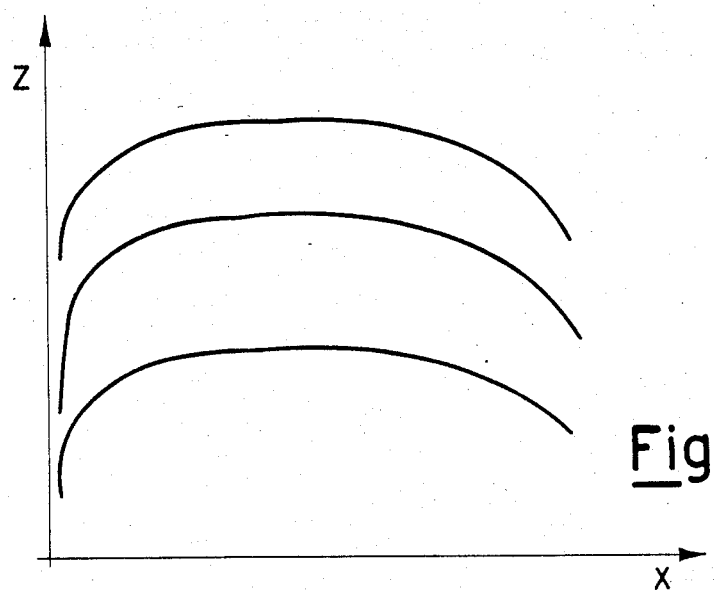
Fig.3A
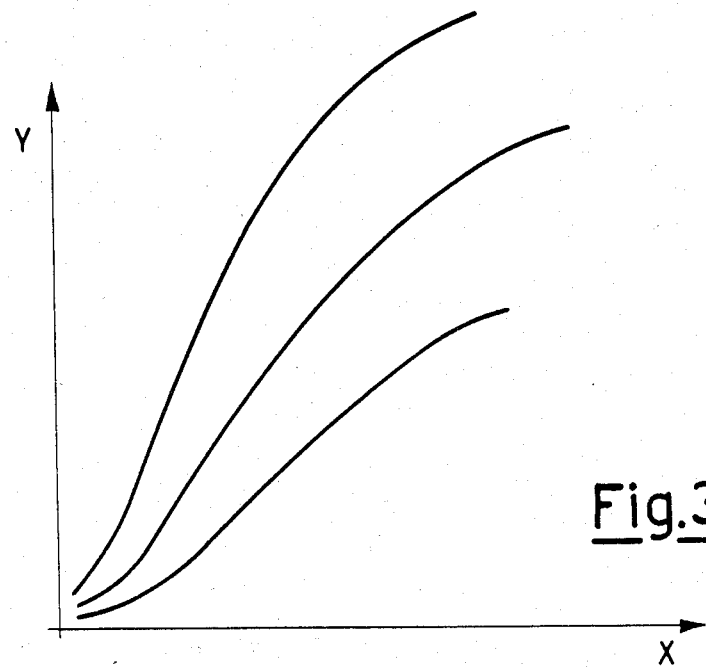
Fig.3B
Fig.3

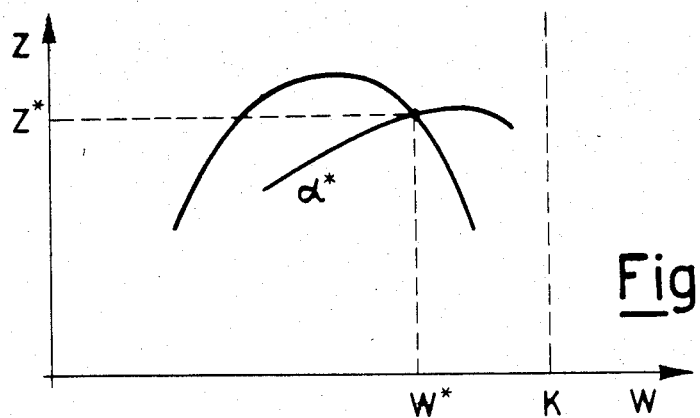
Fig.4A
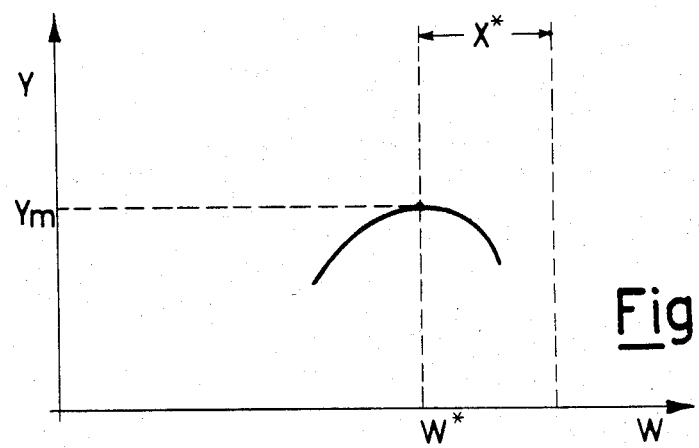
Fig.4B
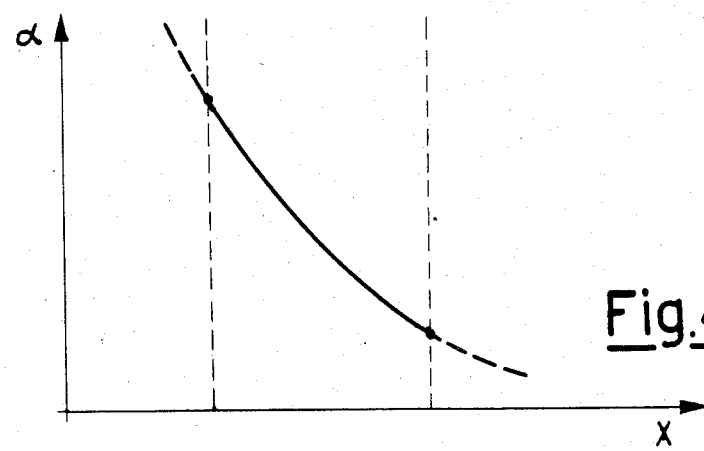
Fig.4C
Fig.4

EXPLOITATION OF WIND ENERGY FOR PRODUCING ELECTRICAL POWER

The present invention relates to the exploitation of wind energy for the production of constant frequency electrical power.

The main difficulty to be faced whenever it is desired to exploit the energy of the wind to produce electrical power arises from the extreme variability of the wind, which is poorly adapted to satisfy a power demand which follows quite different trends. Various accumulation systems have been suggested and tested with fair results, but they are subject to conditions which are often very restrictive and expensive, both from the point of view of their construction and their practical use.

According to the present invention, there is provided an apparatus for producing electrical power by the use of wind energy, comprising a wind rotor and a prime mover both connected to an electrical generator via a differential so that in use the generator runs at a substantially constant speed.

The present invention also provided a method of producing electrical power at a constant frequency by the use of wind energy, wherein a wind rotor is coupled to a prime mover and to an electrical generator which is kept at a constant speed by means of a mechanism for summing the angular speeds and comprising a differential which has its planet gear carrier connected to the generator and its two half-shafts connected one to the prime mover and the other to the wind rotor.

By use of the apparatus of the invention, it is possible to generate power with more uniform characteristics, and it can be stated that, within certain limits, the contribution of the wind rotor to the total power produced tends to relieve the auxiliary prime mover (which is other than a wind rotor).

The electrical power produced by the apparatus comprising the prime mover, wind rotor and alternator can be fed to a users' network in parallel with a high power electrical grid adjusted to a constant frequency, or it can feed a local network to which other generators are conncted. In the former case, the electrical and mechanical characteristics of the apparatus should be such as to make it possible to have a stable coupling which is not such as to load the network with reactive loads. By using wind energy only as a source of energy (i.e. by direct coupling of a wind rotor to a synchronous or an induction generator and then to the network) this would be possible, but it would not be possible to exploit to the utmost the wind power within a predetermined speed range and thus the overall average efficiency of the system would be low. It might be thought possible to solve such a problem merely by the use of devices such as movable-vane rotors or sophisticated regulation systems; however, such devices have high initial costs and high running costs. The present invention, conversely, permits the use of, inter alia, wind movers of the fixed vane type which are sturdy and reliable. The prime mover can be any appropriate prime mover dependent upon the locally available power sources.

When the apparatus of the invention is connected to a high-power network, a synchronous generator is preferred as the generator. In this case, a network which, from an electrical standpoint, behaves like an ideal voltage generator at constant frequency, is capable of absorbing all the produced power; the interaction between the stator and rotor rotating fields causes a synchronizing torque which requires, as the necessary condition for maintaining a steady state, that the angular speed of the mechanical axis of the synchronous generator be equal to a well determined value (synchronism speed).

The characteristic of the synchronizing torque is usually such as to ensure the stability of such a steady state, once it has been reached upon a parallel connection. If the apparatus is to feed widely dispersed users (e.g. workshops, buildings or farms) through a local network not connected to other alternators, other kinds of electrical generators, i.e. generators which are not synchronous generators, can be used. Thus, for example, induction generators can be used. At any rate, the production of electrical power having a constant frequency, when the power is to be fed to an isolated network, requires the use of an additional frequency-regulating device and the availability of electrical installations of low priority (for example water pumping installations), to be modulated if necessary.

For a better understanding of the invention, reference will now be made, by way of example, to the accompanying drawings in which:

FIGS. 2A, 2B, 3A, 3B, 4A, 4B and 4C are graphs which are explained in the description below.

Figure 1:
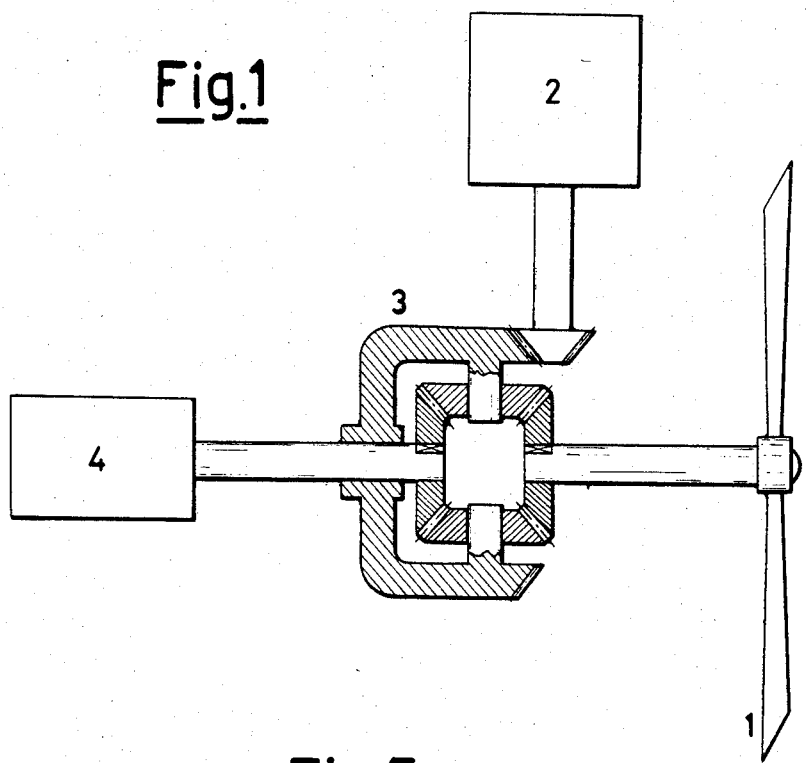
FIG. 1 is a schematic representation of an apparatus of the invention.

Referring to FIG. 1, the mechanical coupling of the three components, namely a synchronous generator 2, a prime mover 4 and a wind mover 1, is effected by the use of a differential 3 whose planet pinion carrier 3a meshes with a bevel pinion 2a on the input shaft of the generator 2. The two planet pinions 3b of the differential 3 are freely mounted on the carrier 3a, whereas the two sun pinions of the differential 3 are rigidly mounted on respective half-shafts one 4a is connected to the shaft 4a of the prime mover 4 and the other 1a is connected to the shaft 1a of the wind rotor 1. In such a coupling, the differential 3 acts as a device which sums the angular speeds so that, by appropriately varying the rotation rate of the prime mover 4, it is possible to allow for variations of the rotation rate of the wind rotor 1 by transferring to the synchronous generator 2 a drive equal to the sum of the instantaneous drives generated by the prime mover 4 and the wind rotor 1, at a constant angular speed.

FIGS. 2A and 2B respectively show the variation of the torque Z and the power Y generated by the wind rotor (fixed vane type) as a function of the wind speed, and hence the angular speed W of the rotor. In FIG. 2B, there is additionally plotted a line which connects the points of maximum power of the wind rotor.

FIGS. 3A and 3B respectively show the variation of the same parameters, i.e. the torque Z and the power Y, for a particular type of prime mover (namely an internal combustion engine) as a function of the angular speed X of the engine, for different values of the feed to the engine.

On account of the width of that portion of characteristic curve which can be exploited in the case of an internal combustion engine, it is possible, for each determined wind speed, to have the apparatus set itself about a steady state condition so that the angular speed corresponds to a maximum mechanical power at the shaft of the wind rotor. This result can be achieved by servoing the feed to the prime mover 4 so that its angular speed X attains, in any given case, the value which corresponds to the desired value for the angular speed W of the rotor.

More particularly, on bearing in mind that, in the case of a connection to a fixed-frequency electric network, there must be, for each steady-condition operation of the apparatus, a constant k (where $k=X+W$), it is possible to obtain the required characteristics of operation of a servo device for regulating the prime mover 4. For each value of the wind speed, there is a well determined value of W (for instance W*) to which there corresponds the maximum power $Y_m$ obtainable from the wind rotor (FIG. 4B). Under such conditions, a given torque Z* is generated by the shaft of the wind rotor (FIG. 4A).

The equilibrium established by the differential ensures that the prime mover 4 generates a torque equal to Z*. Given that a particular family of characteristic curves exists in the case that, for example, the prime mover 4 is a Diesel engine, it is possible, as a rule, to find one of these curves for which there corresponds a certain value (for instance $\alpha$*) of the feeding rate of flow (engine speed) at which the torque produced equals Z*, i.e. at which the angular speed of the prime mover is X* (where $X^*=K-W^*$) (FIG. 4B).

It is thus possible to trace, point by point, a plot such as shown in FIG. 4C in which, for a particular range, there corresponds, for each value of X equal to X*, a value $\alpha=\alpha^*$ of the feed rate of flow (engine speed) of the prime mover (characteristic of operation of the servo device).

Figure 5:
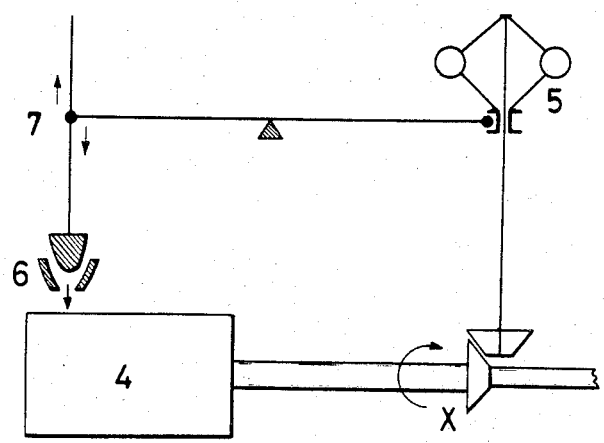
FIG. 5 is a schematic representation of a servo device for use in the invention.

An embodiment of the servoing device used in the present invention is shown in FIG. 5, for the case when the prime mover 4 is a Diesel engine. The device consists of a tachometer device 5, a fuel injector 6 and an injector control device 7.

Should it be desired to exploit the widest possible wind range, from the faintest wind to the strongest wind, it would be necessary, in the former of the two cases described herein, to use a prime mover having a power output comparable to the maximum power output of the wind rotor, and, in such a case, with fair breezes a predominance of the power produced by the prime mover 4 over that produced by the wind rotor 1 would occur. This is far from being desirable because the production of electrical power is obtained at better efficiencies by power stations of large size. However, by appropriately trimming the exploitation range (by "idling" the wind rotor for very faint breezes and by "feathering" the wind rotor for very strong gales) it is possible to have an averge exploitation of the two power sources of 30% or less from the prime mover 4 and the balance from the wind rotor 1. This would result in the generation of average power of three times that generated by the prime mover, and the savings of conventional sources of power would be apparent.

When the apparatus is connected to a local network, both the wind rotor and the prime mover must have a nominal power output comparable to the maximum power required by the local network.

The servo unit causes power from the prime mover to be used to a greater or a lesser degree, depending upon the power produced by the wind rotor. An energy balance between the produced and the absorbed energy (a condition which is essential to maintain any steady state conditions) can be achieved, as outlined above, by modulating the demand from low priority users by an additional regulation unit which will maintain constant the angular speed of the electrical generator.

We claim:

1. An apparatus for producing electrical power by the use of wind energy, comprising a synchronous generator having an input shaft and a bevel pinion connected thereto; a wind rotor having a shaft connected thereto which is adapted to be rotated by said rotor in response to the speed of the wind; a prime mover having a shaft connected thereto which is adapted to be rotated at an angular speed, means operatively connected to said prime mover and said wind rotor for varying the angular speed of said prime mover shaft in response to the angular speed of said wind rotor shaft so that a constant angular speed drive is adapted to be transferred to said generator which equals the sum of the angular speeds of said prime mover and wind rotor shafts; a differential which sums the angular speeds of said shafts for transfer to said generator, including a carrier, a pair of planet pinions freely mounted on said carrier, a pair of sun pinions wherein one sun pinion is fixedly mounted on said prime mover shaft and wherein the other sun pinion is fixedly mounted on said wind rotor, and a planet pinion on such carrier which meshes with said bevel pinion for transfer of the sum of the angular speeds of said prime mover and wind rotor to said generator; and a servo device connected to the shaft of the prime mover and to a feed control of the prime mover whereby the feed can be adjusted as a function of the speed of the wind rotor so that the wind rotor works at the maximum efficiency, including a tachometer connected to the shaft of the prime mover and to an injector control device, said injector control device is connected to a fuel injector which is connected to the prime mover for adjusting the angular speed to correspond to the maximum mechanical power at the shaft of the wind rotor.

2. An apparatus as claimed in claim 1, wherein the prime mover is an internal combustion engine.

* * * * *